S. B. CLAYTON.
AUTOMOBILE LOCK.
APPLICATION FILED SEPT. 22, 1920.

1,395,906.

Patented Nov. 1, 1921.
2 SHEETS—SHEET 1.

WITNESSES

INVENTOR
S. B. Clayton,
BY
ATTORNEYS

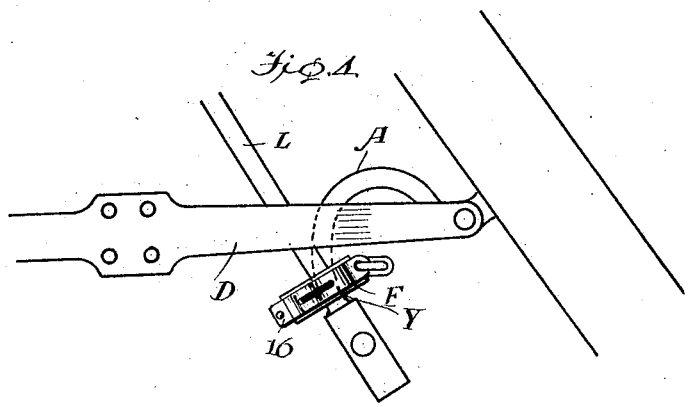
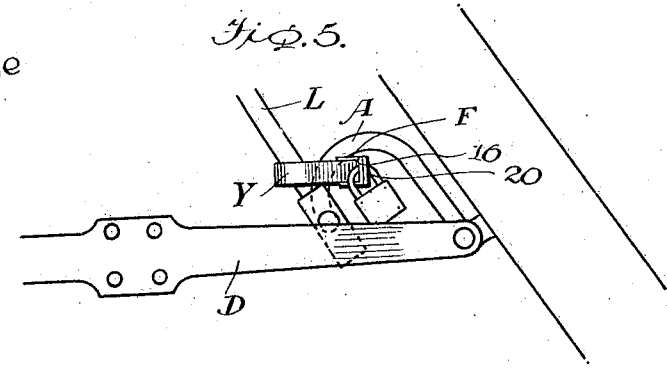
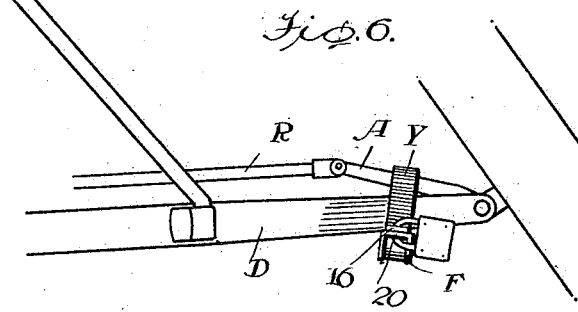

UNITED STATES PATENT OFFICE.

SAMUEL BUN CLAYTON, OF GREENSBORO, NORTH CAROLINA.

AUTOMOBILE-LOCK.

1,395,906.

Specification of Letters Patent.

Patented Nov. 1, 1921.

Application filed September 22, 1920. Serial No. 412,006.

*To all whom it may concern:*

Be it known that I, SAMUEL BUN CLAYTON, a citizen of the United States, and a resident of Greensboro, in the county of Guilford and State of North Carolina, have invented certain new and useful Improvements in Automobile-Locks, of which the following is a specification.

My invention relates to locking devices applicable to automobiles for preventing the surreptitious use thereof, and more particularly to that type of locking device which is adapted to lock the steering gear against movement so that upon unauthorized movement of the vehicle it will be caused to travel in an unchangeable direction.

The purpose of my invention is the provision of a locking device of this character which is universally adaptable to steering gears of the standard construction, my invention being of simple, inexpensive and durable construction and capable of being converted into various forms to permit of its effective application to various types of steering gears.

I will describe one form of locking device embodying my invention and three forms of steering gears to which it may be applied, and will then point out the novel features thereof in claims.

In the accompanying drawings:

Figs. 4, 5 and 6 are plan views of certain standard forms of steering gears showing applied thereto the locking device, with the latter occupying the form necessary to permit of its application to a corresponding steering gear.

Similar reference characters refer to similar parts in each of the several views.

Figure 1:
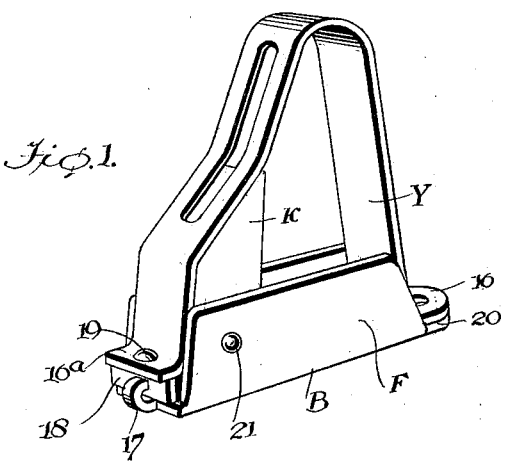
Figures 1, 2 and 3 are perspective views showing one locking device embodying my invention in each of its several positions.
Figure 2:
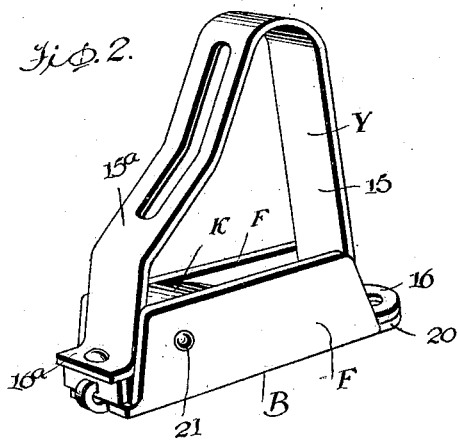
Figure 3:
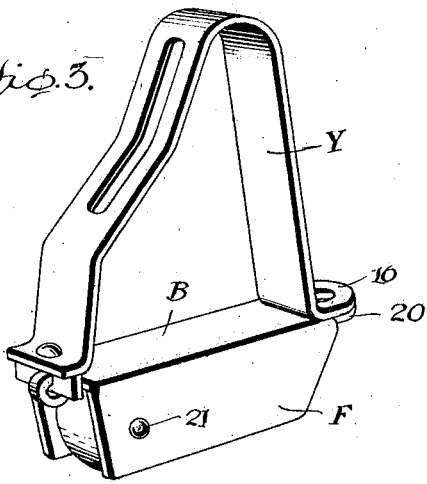

Referring specifically to the drawings and particularly to Figs. 1, 2 and 3, B designates a base plate formed of metal and of suitable dimension, its longitudinal edges being provided with laterally extending flanges F that are substantially co-extensive in length with such plate. Connected to one end of the base plate B for universal movement is a yoke Y comprising divergent portions 15 and 15ª provided at their free ends with laterally bent lips 16 and 16ª, respectively. The portion 15 is of linear form, while the portion 15ª is bent inwardly and outwardly so that the free end of the portion is spaced apart a distance equal to the length of the base plate B. As previously stated, the yoke Y is universally connected to the base plate B, and in the present instance, such connection consists of a ring 17 formed integral with the plate B and extending through an opening formed in a rectangular shaped ring 18 which is rotatably supported upon the lip 16ª by means of a pin 19. The lip 16 is formed with an opening which, in the applied position of the yoke registers with a similar opening formed in the projecting end 20 of the base plate B. By passing a padlock through the openings of the lip 16 and end 20, it will be clear that the yoke can be locked in applied position with respect to the base plate. In this applied position of the yoke, it is to be particularly noted that the free ends of the yoke are disposed between the flanges F thus preventing any lateral movement of the yoke with respect to the base plate.

In conjunction with the yoke Y I employ a block K which is pivotally supported between the flanges F by means of a pin 21. This block K is so shaped that when moved to the vertical position as shown in Fig. 1 it restricts the internal area of the yoke for a purpose which will be hereinafter described. When in horizontal position, the block K is wholly between the flanges F so that the entire internal area of the yoke is accessible.

The locking device in the form shown in Fig. 1 is particularly adapted for the locking of a J-Cox type of steering gear in which, as shown in Fig. 4, the forward ends of the drag link L and the spindle or third arm A are connected to each other at a point in advance of the front axle D. In this form of the locking device, the block K assumes a vertical position so as to constrict the internal area of the yoke Y so that such yoke will snugly embrace the drag link and spindle arm. With the locking device in this position, a padlock is passed through the lip 16 and its end extension 20 thus securely retaining the yoke and base plate B in embracing formation with respect to the steering gear. As applied, the locking device obviously prevents operation of the steering gear so that the surreptitious use of the car is prevented.

In Fig. 5 I have shown the Dodge form of steering gear in which the drag link L and the spindle or third arm A are connected to each other at a point in the rear of the front axle D. To permit of the application of the locking device to this form of steering gear, it is necessary to convert the same to the form shown in Fig. 2 wherein it will be seen that the block K is moved to a horizontal position so that the entire internal area of the yoke can be used. In the applied position of the locking device to a steering gear, the entire device is turned to a right angular position as with respect to its position as shown in Fig. 1 so as to permit the yoke to accommodate the drag link and spindle arm at the particular angles they occupy when the front wheels are in an oblique position.

In Fig. 6 I have shown the Ford type of steering gear in which the connecting rod R as well as the spindle arm A are connected to each other at a point in the rear of the front axle D. In the applied position of the locking device to this type of steering gear, it assumes the form shown in Fig. 3 in which it will be seen that the base plate, together with the flanges F and the block K are reversed as with respect to the yoke Y so as to increase the internal area of the yoke. This is done for the purpose of allowing the yoke Y to receive the front axle D, as in Fig. 6 it will be seen that the locking device embraces the axle and spindle arm so as to lock the latter against movement.

Although I have herein shown and described only one form of locking device embodying my invention, it is to be understood that various changes and modifications may be made herein without departing from the spirit of the invention and the spirit and scope of the appended claims.

What I claim is:

1. An automobile lock of the character described comprising, a base plate, flanges extending laterally from one side of the plate, a yoke swivelly connected to one end of the base plate, said yoke including a linear portion and a divergent inwardly bent portion, lips formed on the free ends of said portions, a block pivotally supported between the flanges, and an end extension formed on the base plate, locking means extending through a lip on the linear portion and said extension for securing the free ends of the base plate and yoke together.

2. An automobile lock of the character described comprising, a yoke, a base plate spanning the ends of the yoke and universally connected thereto, and a block associated with the yoke and base plate to increase or decrease the internal area of the yoke for the purpose described.

3. An automobile lock of the character described comprising, a yoke, a base plate adapted to span the ends of the yoke and universally connected thereto, and flanges formed on the base plate and embracing the yoke to prevent lateral displacement one with respect to the other.

4. An automobile lock of the character described comprising, a yoke, a base plate adapted to span the ends of the yoke and universally connected thereto, flanges formed on the base plate and embracing the yoke to prevent lateral displacement of one with respect to the other, and a block pivotally mounted between the flanges and movable to decrease or increase the internal area of the yoke.

5. An automobile lock of the character described comprising, a yoke, a base plate adapted to span the ends of the yoke and universally connected thereto, and flanges formed on the base plate and embracing the yoke to prevent lateral displacement of one with respect to the other, an extension on the base plate, a lip formed on the yoke, said lip and extension being formed with registering perforations adapted to receive a lock for effecting the locking of the yoke and base plate together.

SAMUEL BUN CLAYTON.